United States Patent Office 3,755,578
Patented Aug. 28, 1973

3,755,578
THIAZOLINE AND 5,6-DIHYDRO-4H-1,3-THIAZINE ANTI-PLANT-VIRAL AGENTS
James W. McFarland, Lyme, and Verne A. Ray, Groton, Conn., assignors to Pfizer Inc., New York, N.Y.
No Drawing. Original application June 6, 1969, Ser. No. 831,245, now Patent No. 3,629,247, dated Dec. 21, 1971. Divided and this application Jan. 6, 1971, Ser. No. 104,478
Int. Cl. A01n 9/00
U.S. Cl. 424—246
6 Claims

ABSTRACT OF THE DISCLOSURE

Aryl vinyl derivatives of thiazoline and 5,6-dihydro-4H-1,3-thiazine which exhibit antiviral activity particularly in the combating of plant viral diseases.

CROSS REFERENCE TO RELATED APPLICATION

This application is a division of application Ser. No. 831,245 filed June 6, 1969 and now U.S. Pat. 3,629,247, dated Dec. 21, 1971.

BACKGROUND OF THE INVENTION

This invention is concerned with new and useful organic agents. In particular, it is concerned with the preparation and use of aryl vinyl derivatives of thiazoline and 5,6-dihydro-4H-1,3-thiazine, capable of exerting or exhibiting activity.

Many therapeutic substances which are antiviral in activity have been previously reported. These range from antibiotics and other fermentation products to specific antimetabolites and synthetic chemicals.

Although the literature has reported antiviral activity for various organic substances this invention relates to a unique class of aryl vinyl thiazoline and 5,6-dihydro-4H-1,3-thiazine dihydrothiazine compounds exhibiting antiviral activity.

Antiviral compounds are sought for the treatment of human, animal and plant viral diseases. In the agricultural area the combating of plant viral infections is a prime economic consideration and compounds capable of this action are of extreme importance, since at the present time plant viral diseases are indirectly treated by control of the insects transmitting the disease, by the development of resistant plant varieties or by removing and destroying infected plants as soon as they appear. This invention obviates the need for the aforementioned techniques and allows for the direct treatment and prevention of the disease by means of a plant antiviral agent.

Some of the more prevalent viral diseases known in agriculture which can be treated by this invention are Peach Yellow, Little-Peach, Beet Curly-Top, Tobacco Mosaic, Bean Mosaic, Alfalfa Mosaic, Tomato Spotted Wilt, Chlorotic Streak of Sugar Cane and Cotton Leaf Curl.

SUMMARY OF THE INVENTION

In accordance with the present invention a method is provided comprising the step of applying to the plant an effective amount of a compound selected from the group consisting of those of the formula:

A=CH=CH—B and non-phytotoxic acid addition salts thereof, wherein A is phenyl, thienyl, pyridyl, naphthyl or 3,4-methylenedioxyphenyl, or a monosubstituted derivative thereof, wherein said substituent is hydroxy, alkyl, alkyloxy, halogen, nitro or dialkylamino, said alkyl groups containing from 1 to 4 carbon atoms and B is 5,6-dihydro-4H-1,3-thiazinyl or thiazolinyl.

The compounds wherein the A group is phenyl or thienyl or monosubstituted derivatives thereof are known, some of which are disclosed in British specification 1,102, 466 and U.S. Pat. 3,390,148. However, the novel method of using these compounds as described in this invention has never been contemplated.

DETAILED DESCRIPTION OF THE INVENTION

The compounds of this invention are readily and conveniently prepared by the direct condensation of the desired carboxaldehyde (ACH=O in which A has been previously defined) e.g., benzaldehyde, 3-bromobenzaldehyde, 3 - pyridinecarboxaldehyde, 2-thiophenecarboxaldehyde, 2-naphthalenecarboxaldehyde and 3,4-(methylenedioxy)benzaldehyde with 2-methylthiazoline or 2-methyldihydrothiazine. The starting materials for the synthesis of the compounds of this invention are readily available commercially or may easily be prepared. The reaction is conducted in general at an elevated temperature, that is, at a temperature sufficiently high to remove the by-product water formed. Temperatures of from about 80 degrees C. to about the decomposition point of the reactants and product can be used. It is advantageous to use a reaction-inert solvent, desirably one which forms an azeotrope with the water, and temperatures of from about 80 degrees C. to the reflux temperature of the solvent. The compounds thus produced have the trans configuration.

The resultant compounds may be purified e.g., by reaction with hexafluorophosphoric acid to form a crystalline solid which may be easily isolated.

The hexafluorophosphate salts may then be readily converted to the free base by neutralization of the salt by aqueous sodium or potassium hydroxide and the water insoluble free base received by mechanical means or by solvent extraction with a suitable immiscible solvent such as ethyl acetate or ethyl ether. The free base, isolated by removal of the solvent, can if desired, be purified by recrystallization from a suitable solvent system or by vacuum distillation. Alternatively, the free bases are obtained by neutralization of an acid salt with sodium methoxide in methanol and recovery of the base by known methods. Other acid addition salts may be readily prepared simply be dissolving the free base in a suitable solvent, e.g., acetone, water, a lower aliphatic alcohol (ethanol isopropanol) containing the desired acid, or to which the desired acid is subsequently added. The salts are recovered by filtration, precipitation with a non-solvent, by evaporation of the solvent or, in the case of aqueous solutions by lyophilization. In this manner non-phytotoxic water soluble and water insoluble, addition salts such as the hydrochloride, hydrobromide, phosphate, nitrate, sulfate, acetate, hexafluorophosphate, citrate, gluconate, benzoate, propionate, butyrate, sulfosalicylacte, maleate, laurate, malate, fumarate, succinate, oxalate, tartrate, amsonate, pamoate, stearate, p-toluenesulfonate, and other salts can be prepared.

By "non-phytotoxic" acid addition salts is meant those salts which are not toxic to the plants, or seeds at the levels used to achieve antiviral action.

The compounds encompassed by the structure indicated show in vitro antiviral activity at the 1 $\mu$g./ml. level in a Newcastle Diseases virus test which measures the antiviral effect on viral RNA replication is infected cells.

Further screening experiments against plant viral diseases such as Tobacco Mosaic demonstrate that these agents can be used for combating plant viral infections, where the term combating is used to indicate prevention as well as eradication.

These compounds are preferably used in about 0.01% to 1.0% by weight concentration, and they may be combined with conventional additives to give solutions, emulsions, or dispersions for spraying and dipping; also granules and dusts.

Generally, the volume of spray per acre is desirably in the range of from about 150 to about 175 liters per acre, 160 liters per acre being the preferred volume. Application at these levels is sufficient to achieve run-off and assures substantially complete contact of the surface of the plant with the active ingredient. The use of water insoluble forms of these agents is preferred for foliar sprays over that of the water soluble forms to avoid their removal from the plants by rain or flooding.

For convenience and economy of application, the active ingredients are formulated into dusts, wettable powders or emulsifiable concentrates. The dusts are made by mixing the proper amount of active ingredient with a diluent such as talc, clay, calcite, pyrophyllite, diatomaceous, earth, walnut-shell flour, silica gel, hydrated alumina or calcium silicate to afford a concentration of active ingredients of from about 2% to about 4% by weight. The dusts can also be prepared by mixing the desired dust diluent with a solution of the active ingredient of choice in a volatile organic solvent such as benzene or acetone. The solvent is then removed by evaporation and the mixture ground.

Wettable powders, of special value for spray applications, are made by adding suitable wetting agents and conditioning agents to the dusts.

Emulsifiable concentrates are made by dissolving the active ingredient and an emulsifying agent in substantially water immiscible organic solvent. Suitable solvents are toluene, xylene and petroleum oil or an alkylated naphthalene. The volatile solvents, e.g., toluene, xylene, evaporate after spraying to leave a deposit of the active agent upon the plant. The nonvolatile solvents leave an oily solution of the active ingredient upon the plant. The emulsifying agent can be cationic, anionic, or non-ionic as is well known to those skilled in the art. As suitable emulsifiers there may be mentioned soap (anionic), lauryl pyridinium chloride (cationic) and polyoxyethylene lauryl ether (reaction product of ethylene oxide, ten moles, with dodecylalcohol, one mole). Such concentrates contain, in general, from 2 to 50% of the active ingredient. They are mixed with a sufficient volume of water to provide a concentration of active ingredient of from 10 to 5000 p.p.m. For the present purpose, the resulting emulsion is applied at a rate of from about 100 to 200 liters per acre and usually at 150–175 per acre.

Of course, if a water soluble salt of the chosen active ingredient is used, it is most conveniently applied in the form of an aqueous spray. Here also, the rate of application is desirably from about 150 to 175 liters per acre of a solution containing 10–5000 p.p.m. of active ingredient.

The agents described herein can also be used as antiviral seed dressings. When used for the treatment of seeds the favored forms of these antiviral agents are as dusts, solutions, slurries, or emulsions which are applied directly to the seed by appropriate means as by tumbling with the dust or mixing the solution. For seed protection the levels of antiviral agent mentioned above are used, e.g. 10–5000 p.p.m. of active ingredient in solutions emulsions, sprays and 2%–4% in dusts.

In the formulations mentioned above, as those skilled in the art will appreciate, a wide choice of diluents, emulsifiers, solvent or wetting agents is available. The particular diluent, emulsifier, solvent, or wetting agent best suited for a given formulation is readily determined by simple experiment.

The following examples are provided by way of illustration and should not be interpreted as limiting the invention, many variations of which are possible without departing from the spirit or scope thereof.

Example I

Trans - 5,6 - dihydro - 2-[2-(2-naphthyl)vinyl]-4H-1,3-thiazine.—A solution of 115.2 g. (1.00 mole) of 5,6-dihydro-2-methyl-4H-1,3-thiazine, 156.2 g. (1.00 mole) of 2-naphthalenecarboxaldehyde, and 400 ml. of toluene is heated under reflux in an apparatus which includes a Dean-Stark moisture trap until 17 ml. of water is collected. The solution is then allowed to cool, and the more volatile components are evaporated under reduced pressure. The residual oil is crystallized from benzene to give bright yellow crystals of trans-5,6-dihydro-2-[2-(naphthyl) vinyl]-4H-1,3-thiazine: yield 70 g. (28%): M.P. 146°–147°C.

*Analysis.*—Calcd. for $C_{16}H_{15}NS$ (percent): C, 75.8; H, 6.0; N, 5.5. Found (percent): C, 76.2; H, 6.0; N, 5.4.

Example II

A solution of 0.02 mole of 5,6 - dihydro - 2 - [2 - (2-naphthyl)vinyl]-4H-1,3-thiazine in acetone is treated with 8.0 ml. of 3.4 N HCl in methanol. Upon cooling, the mixture yields the hydrochloride salt of the aforementioned compound.

The hexafluorophosphate salt is prepared by pouring 1 mole of the above thiazine base into a mixture of 65% hexafluorophosphoric acid, 375 g. of ice to give a precipitate which gradually crystallizes when the mixture is stirred continually. When the ice melts the mixture is filtered, and the solid residue is recrystallized twice from methanol to furnish the hexafluorophosphate salt.

Example III

In a manner similar to that described in Examples I and II the following compounds are obtained by the condensation of the appropriate aryl carboxaldehyde with 5,6-dihydro-2-methyl-4H-1,3-thiazine:

5,6 - dihydro-2-[2-(4-pyridyl)vinyl]-4H-1,3-thiazine, M.P. 80°–81° C.
5,6 - dihydro-2-[2-(3-pyridyl)vinyl]-4H-1,3-thiazine hexafluorophosphate M.P. 190°–194° C.
5,6 - dihydro-2-[2-(1-naphthyl)vinyl]-4H-1,3-thiazine hydrcholoride M.P. 195°–196° C.

Example IV

By means of the procedures of Examples I and II the following compounds and their hydrochloride and hexafluorophosphate salts are obtained by the condensation of the appropriate aryl carboxaldehyde with 5,6-dihydro-2-methyl-4H-1,3-thiazine:

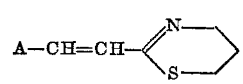

wherein A is 2-chloro-3-pyridyl
2-bromo-4-pyridyl
3-hydroxy-4-pyridyl
3-methyl-4-pyridyl
2-methoxy-3-pyridyl
2-methoxy-4-pyridyl
2-dimethylamino-4-pyridyl
2-nitro-4-pyridyl
4-hydroxy-2-naphthyl
3-hydroxy-1-naphthyl
3-bromo-2-naphthyl
4-chloro-2-naphthyl
3-methyl-1-naphthyl
3-methoxy-1-naphthyl
3-methoxy-2-naphthyl
3-dimethylamino-2-naphthyl
4-nitro-2-naphthyl
2-chloro-3,4-methylenedioxyphenyl
2-hydroxy-3,4-methylenedioxyphenyl
5-methyl-3,4-methylenedioxyphenyl
2-methoxy-3,4-methylenedioxyphenyl
5-dimethylamino-3,4-methylenedioxyphenyl
2-nitro-3,4-methylenedioxyphenyl

Example V

2-[2-(2-naphthyl)vinyl]-2-thiazoline.—In a manner analogous to the procedures of Example I, 2-[2-(2-naphthyl)vinyl]-2-thiazoline and its hydrochloride and hexafluorophosphate salts are obtained by the condensation of 156.2 g. (1.0 mole) of 2-naphthalene-carboxaldehyde with 101.2 g. (1.0 mole) of 2-methyl-2-thiazoline.

Example VI

The procedures of Example V are repeated to prepare the following compounds and their hydrochloride and hexafluorophosphate salts by the condensation of the appropriate aryl carboxaldehyde with 2-methyl-2-thiazoline.

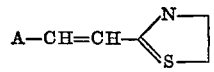

wherein A is 3-pyridyl
4-pyridyl
3-hydroxy-4-pyridyl
2-chloro-3-pyridyl
2-bromo-4-pyridyl
3-methyl-4-pyridyl
2-methoxy-4-pyridyl
2-dimethylamino-4-pyridyl
2-nitro-4-pyridyl
1-naphthyl
4-hydroxy-2-naphthyl
3-hydroxy-1-naphthyl
3-bromo-2-naphthyl
4-chloro-2-naphthyl
3-methyl-1-naphthyl
3-methoxy-2-naphthyl
3-methoxy-1-naphthyl
3-dimethylamino-2-naphthyl
4-nitro-2-naphthyl
2-chloro-3,4-methyldenedioxyphenyl
2-hydroxy-3,4-methylenedoxyphenyl
5-methyl-3,4-methylenedioxyphenyl
2-methoxy-3,4-methylenedioxyphenyl
5-dimethylamino-3,4-methylenedioxyphenyl
2-ntiro-3,4-methylenedioxyphenyl

Example VII

Other acid addition salts of the new compounds of the present invention are prepared by the procedures of Example II employing hydrobromic acid, phosphoric acid, nitric acid, sulfuric acid, citric acid, gluconic acid, benzoic acid, propionic acid, butyric acid, sulfosalicyclic acid, malei acid, lauric acid, malic acid, fumaric acid, succinic acid, oxalic acid, tartaric acid, amsonic acid, pamoic acid, stearic acid and p-toluenesulfonic acid.

Example VIII

The anti-viral activity of the compounds of this present invention is determined by an intracellular RNA assay performed in the following manner:

Ten day-old chick embryo bodies are minced, trypsinized and the cells separated, washed, and resuspended in a medium at a concentration of $2-3 \times 10^6$ cells/ml. Several aliquots of this suspension are infected with Newcastle's Disease Virus at a multiplicity of infection of 50 to 1.0 and incubated 40 minutes at 37° C. Other aliquots are not infected but incubated for the 40 minutes as controls. All cells are then washed by centrifugation and resuspended in a medium containing 2.0% calf serum, at a concentration of $2-3 \times 10^6$ cells/ml. The infected cell suspension is divided into small 10 ml. cultures to which is added actinomycin D, the compound under study and $^{14}$C-uridine. Actinomycin D at a concentration of 3 μg./ml. inhibited check cell RNA synthesis but permitted viral RNA to be made. The inhibition of viral RNA synthesis is followed by the uptake of $^{14}$C-uridine into the cells over a 6–8 hour period. Samples to be analyzed are removed from the culture flasks, precipitated and washed with cold trichloroacetic acid, filtered onto membrane filters, placed in actintillation vials and counted.

The following table is illustrative of the in vitro antiviral activity as determined by the above described method, of compounds having the formula:

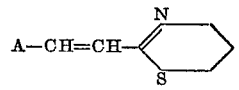

The results are in terms of percent inhibition of viral RNA synthesis at a 1 μg./ml. concentration.

| A: | Antiviral activity, percent |
|---|---|
| Phenyl | 72 |
| 3-chlorophenyl | 71 |
| 3-bromophenyl | 84 |
| 3-methylphenyl | 70 |
| 4-nitrophenyl | 70 |
| 3,4-methylenedioxyphenyl | 72 |
| 2-naphthyl | 84 |
| 4-pyridyl | 85 |

Example IX

An evaluation of the contact effectiveness of 5,6-dihydro-2-[2-(3-bromophenyl)vinyl]-4H-1,3-thiazine in control of Tobacco Mosaic virus on tobacco is made by the following experiment:

The compound is mixed immediately before use with an aliquot of tobacco mosaic concentrated virus solution buffered with 0.01 M phosphate buffer. Surfaces of leaves of tobacco plants (Nicotiara glutinosa) six to eight weeks old are lightly dusted with Carborundum powder. A cotton swab is saturated in the aforementioned solution and then brushed with buffered Tobacco Mosaic virus solution. Five leaves per two plants picked at random, are used for the test. A control using virus treated and untreated plants is also run. The incidence of infection is generally detectable with three to five days following inoculation.

The following results are obtained, which indicated the ability of the test compound to deactivate Tobacco Mosaic virus at a concentration of 5000 p.p.m.:

| | No. lesions | | Total lesions | Percent virus co8trol of disease |
|---|---|---|---|---|
| | Plant 1 | Plant 2 | | |
| Treated plants | 61 | 18 | 79 | 84 |
| Untreated plants | 366 | 139 | 505 | 0 |

Disease severity is determined by actual count of infection loci in inoculated plants. Control effectiveness is expressed as percent virus control of disease and determined by actual count of infection loci in treated plants compared to equivalent counts of infection loci on inoculated loci but otherwise untreated controls.

Example X

The use of 5,6-dihydro-2-[2-(3-bromophenyl)vinyl]-4H-1,3-thiazine as a Tobacco Mosaic virus protectant is demonstrated by the following experiment.

The compound is dissolved in a solvent and formulated into an aqueous system and then applied at 40 p.s.i. for 60 seconds to test tobacco plants, Nicotiara glutainosa, assuring complete coverage of the plant surface. The treated plants are air dried and then inoculated by spraying with an extract from Tobacco Mosaic-infected leaves and carborundum, rubbing leaf surfaces gently to assure epidermal cells rupture. Controls include untreated plants and plants inoculated as above. Disease severity is determined by by actual count of infection loci on inoculated controls. Control effectiveness is expressed as percent virus control and determined by actual count of infection loci on treated plants compared to equivalent counts of infection loci on inoculated but otherwise untreated controls. The test includes a minimum of three replicates.

The results obtained clearly indicate the control effectiveness of the test compound at the use concentration at the end of three days.

| | |
|---|---|
| Conc. p.p.m. | 5000 |
| Percent control | 93 |
| Plant injury | Slight |

The inoculated control averaged 180 infection loci per plant based on three replicates.

Example XI

Using the virus protectant procedure as outlined in Example X, 5,6-dihydro-2-[2-(4-nitrophenyl)vinyl]-4H-1,3-thiazine at a conentration of 1000 p.p.m. is found to be 41% effective in the control of Tobacco Mosaic virus on bean plants, *Phaseolus vulgaris*, L. var. Scotia.

Example XII

Using the experimental procedures of Examples IX and X the following compounds are found to be useful as contact and protective agents in the control of Tobacco Mosaic disease:

5,6-dihydro-2-[2-(3-chlorophenyl)vinyl]-4H-1,3-thiazine
5,6-dihydro-2-[2-(3-methylphenyl)vinyl]-4H-1,3-thiazine
5,6-dihydro-2-[2-(3,4-methylenedioxyphenyl)vinyl]-4H-1,3-thiazine
5,6-dihydro-2-[2-(2-naphthyl)vinyl]-4H-1,3-thiazine
5,6-dihydro-2-[2-(4-pyridyl)vinyl]-4H-1,3-thiazine
2-(2-phenylvinyl)-2-thiazoline
2-[2-(2-hydroxyphenyl)vinyl]-2-thiazoline

What is claimed is:

1. A method of combatting plant viral disease selected from the group consisting of Peach Yellow, Little-Peach, Beet Curly-Top, Tobacco Mosaic, Bean Mosaic, Alfalfa Mosaic, Tomato Spotted Wilt, Chlorotic Streak of Sugar Cane and Cotton Leaf Curl which comprises applying to the plant virus causing said selected disease an antiviral amount of a compound having the formula:

$$A-CH=CH-B$$

or a non-phytotoxic acid addition salt thereof, wherein A is phenyl, thienyl, pyridyl, naphthyl or 3,4-methylenedioxyphenyl, or a monosubstituted derivative thereof, wherein said substituent is hydroxy, alkyl, alkyloxy, halogen, nitro, or dialkylamino, said alkyl groups containing from 1 to 4 carbon atoms, and B is 5,6-dihydro-4H-1,3-thiazinyl or thiazolinyl.

2. A method as claimed in claim 1 wherein A is phenyl and B is 5,6-dihydro-4H-1,3-thiazinyl.

3. A method as claimed in claim 1 wherein A is 3-bromophenyl and B is 5,6-dihydro-4H-1,3-thiazinyl.

4. A method as claimed in claim 1 wherein A is 4-nitrophenyl and B is 5,6-dihydro-4H-1,3-thiazinyl.

5. A method as claimed in claim 1 wherein A is phenyl and B is thiazolinyl.

6. A method as claimed in claim 1 wherein said plant virus is Tobacco Mosaic.

References Cited

UNITED STATES PATENTS 3,471,618  10/1969  Begreboom _____ 424—270

FOREIGN PATENTS 1,102,466  2/1968  Great Britain _____ 424—270

JEROME D. GOLDBERG, Primary Examiner

U.S. Cl. X.R.

424—263, 270